(12) United States Patent
Platt

(10) Patent No.: US 9,333,853 B2
(45) Date of Patent: May 10, 2016

(54) TORQUE VECTORING AXLE ASSEMBLY

(75) Inventor: Winston Platt, Stirling (GB)

(73) Assignee: American Axle & Manufacturing, Inc., Detroit, MI (US)

( * ) Notice: Subject to any disclaimer, the term of this patent is extended or adjusted under 35 U.S.C. 154(b) by 915 days.

(21) Appl. No.: 13/111,087

(22) Filed: May 19, 2011

(65) Prior Publication Data

US 2011/0224044 A1    Sep. 15, 2011

Related U.S. Application Data

(63) Continuation of application No. 12/029,625, filed on Feb. 12, 2008, now Pat. No. 7,951,035.

(60) Provisional application No. 61/026,842, filed on Feb. 7, 2008.

(51) Int. Cl.
*F16H 48/36* (2012.01)
*B60K 17/04* (2006.01)
(Continued)

(52) U.S. Cl.
CPC ............. *B60K 17/046* (2013.01); *B60K 23/04* (2013.01); *B60K 23/0808* (2013.01); *F16H 48/08* (2013.01); *F16H 48/30* (2013.01); *F16H 48/34* (2013.01); *F16H 48/36* (2013.01);
(Continued)

(58) Field of Classification Search
CPC .. B60K 17/046; B60K 23/0808; B60K 23/04; F16H 48/30; F16H 48/34; F16H 48/36; F16H 48/08; F16H 2200/2071; F16H 2048/204; F16H 48/20; F16H 2048/362; F16H 48/32; F16H 37/086

USPC ......... 475/200, 201, 202, 203, 204, 205, 207, 475/209, 214, 221, 5, 150
See application file for complete search history.

(56) References Cited

U.S. PATENT DOCUMENTS 3,851,545 A   12/1974  Gumlich
4,428,452 A    1/1984  Muraoka et al.
(Continued)

FOREIGN PATENT DOCUMENTS

JP    02-038142    2/1990
JP    10-100701    4/1998
JP    2005-042846  2/2005

OTHER PUBLICATIONS

Print-out from website www.intersyn.com (http://www.intersyn.com/index_files/Page383.htm) regarding Milner Continuous Variable Transmission (MCVT).

*Primary Examiner* — Roger Pang
(74) *Attorney, Agent, or Firm* — Harness, Dickey & Pierce, P.L.C.

(57) ABSTRACT

A vehicle driveline with an axle assembly having an input member, a first output member, a second output member and a power distribution system that includes a transmission and a differential. The differential has first and second differential outputs. The first differential output is coupled directly to the first output member. The transmission is configured to control rotary power transmitted through the differential to the first and second output members. The axle assembly is operable in a first mode, which has no effect on a torque transmitted from the second differential output to the second output member, a second mode, which reduces the torque that is transmitted from the second differential output to the second output member, and a third mode that increases the torque that is transmitted from the second differential output to the second output member.

14 Claims, 3 Drawing Sheets

(51) Int. Cl.
  *B60K 23/04* (2006.01)
  *B60K 23/08* (2006.01)
  *F16H 48/08* (2006.01)
  *F16H 48/30* (2012.01)
  *F16H 48/34* (2012.01)
  *F16H 37/08* (2006.01)
  *F16H 48/20* (2012.01)
  *F16H 48/32* (2012.01)

(52) U.S. Cl.
  CPC ............. *F16H 37/086* (2013.01); *F16H 48/20* (2013.01); *F16H 48/32* (2013.01); *F16H 2048/204* (2013.01); *F16H 2048/362* (2013.01); *F16H 2200/2071* (2013.01)

(56) References Cited

U.S. PATENT DOCUMENTS

| | | | |
|---|---|---|---|
| 5,141,072 A | 8/1992 | Shibahata | |
| 5,370,588 A | 12/1994 | Sawase et al. | |
| 5,387,161 A | 2/1995 | Shibahata | |
| 5,842,945 A | 12/1998 | Inoue | |
| 6,056,660 A | 5/2000 | Mimura | |
| 6,461,268 B1 | 10/2002 | Milner | |
| 6,520,884 B2 | 2/2003 | Ooyama | |
| 6,723,016 B2 | 4/2004 | Sumi | |
| 6,962,227 B1 | 11/2005 | Kirkwood | |
| 7,004,876 B2 | 2/2006 | Puiu | |
| 7,044,880 B2 | 5/2006 | Bowen | |
| 7,056,252 B2 | 6/2006 | Gumpoltsberger et al. | |
| 7,059,990 B2 | 6/2006 | Bowen | |
| 7,059,991 B2 | 6/2006 | Puiu | |
| 7,080,707 B2 | 7/2006 | Kirkwood | |
| 7,083,539 B2 | 8/2006 | Bowen | |
| 7,086,982 B2 | 8/2006 | Bowen | |
| 7,125,359 B2 | 10/2006 | Milner | |
| 7,311,631 B2 | 12/2007 | Kushino | |
| 7,503,416 B2 | 3/2009 | Sharma et al. | |
| 7,553,251 B2* | 6/2009 | Nett et al. | 475/221 |
| 2004/0038772 A1* | 2/2004 | McIndoe et al. | 476/1 |
| 2006/0025267 A1 | 2/2006 | Gradu | |
| 2006/0025273 A1 | 2/2006 | Gradu | |
| 2006/0172847 A1 | 8/2006 | Gradu | |
| 2007/0087885 A1 | 4/2007 | Rosemeier et al. | |
| 2007/0087889 A1 | 4/2007 | Rosemeier et al. | |
| 2007/0149342 A1* | 6/2007 | Guenter et al. | 475/214 |
| 2007/0249456 A1* | 10/2007 | Meixner | 475/150 |
| 2010/0137095 A1* | 6/2010 | Baasch et al. | 475/150 |
| 2010/0167862 A1* | 7/2010 | Hoehn | 475/31 |

\* cited by examiner

TORQUE VECTORING AXLE ASSEMBLY

CROSS-REFERENCE TO RELATED APPLICATIONS

This application is a continuation of U.S. application Ser. No. 12/029,625 filed Feb. 12, 2008 (now U.S. Pat. No. 7,951,035 issued May 31, 2011), which claims the benefit of U.S. Provisional Application No. 61/026,842, filed on Feb. 7, 2008.

INTRODUCTION

The present invention generally relates to vehicle drivelines and more particularly to a vehicle driveline that employs a torque vectoring axle assembly to perform a torque vectoring function to one or more of the vehicle wheels.

The term "torque vectoring" is a generic term that describes the ability of a vehicle driveline to redistribute torque between two or more vehicle wheels in response to driver demand. Accordingly, the torque and/or speed to one or more vehicle wheels can be modified independently to create a yaw moment that enhances vehicle handling.

Some torque vectoring systems employ multi-plate clutch packs that are modulated by mechanical, electrical, and/or hydraulic means. Such systems, however, can be affected by the accuracy of the clutch pack modulation to achieve the desired torque/speed control. Moreover, significant heat can be generated when the clutch(es) slip. Accordingly, there remains a need in the art for an improved torque vectoring system.

SUMMARY

In one form, the present teachings provide a vehicle driveline having an axle assembly with an input pinion, which is configured to receive a rotary input, a input ring gear, which is meshingly engaged with the input pinion, a first output member, a second output member and a power distribution system. The first output member is configured to drive a first vehicle wheel on a first side of a vehicle. The second output member is configured to drive a second vehicle wheel on a second side of the vehicle opposite the first side. The power distribution system is driven by the input ring gear and distributes drive torque between the first and second output members. The power distribution system includes a first continuously variable transmission.

In another form, the present teachings provide a method for operating a driveline of a vehicle. The method includes: providing an axle assembly having a power distribution system, the power distribution system being configured to drive a first wheel on a first lateral side of the vehicle and a second wheel on a second lateral side of the vehicle opposite the first lateral side; transmitting rotary power to the power distribution and segregating the rotary power into a first portion and a second portion; segregating the first portion of the rotary power into a first sub-portion and a second sub-portion; applying the first sub-portion to an first output member, the first output member being coupled with one of the first and second wheels; applying the second sub-portion to a first continuously variable transmission; and operating the first continuously variable transmission to produce a first supplemental power output that is provided to the first output member.

In still another form, the present teachings provide a vehicle driveline that includes an axle assembly having an input member, a first output member, a second output member and a power distribution system. The input member is configured to receive a rotary input. The first output member is configured to drive a first vehicle wheel on a first side of a vehicle. The second output member is configured to drive a second vehicle wheel on a second side of the vehicle. The power distribution system is driven by the input member and distributes torque between the first and second output members. The power distribution system has a differential and a transmission. The differential has first and second differential outputs that are received in a differential case. The first differential output is coupled directly to the first output member. The transmission is configured to control rotary power transmitted through the differential to the first and second output members. The axle assembly is operable in a first mode, a second mode and a third mode. Operation of the axle assembly in the first mode has no effect on a torque transmitted from the second differential output to the second output member. Operation of the axle assembly in the second mode reduces the torque that is transmitted from the second differential output to the second output member relative to the torque that is supplied to the second output member when the axle assembly is operated in the first mode. Operation of the axle assembly in the third mode increases the torque that is transmitted from the second differential output to the second output member relative to the torque that is supplied to the second output member when the axle assembly is operated in the first mode.

In yet another form, the present teachings provide a vehicle driveline that has an axle assembly with an input member, a first output member, a second output member and a power distribution system. The input member is configured to receive a rotary input. The first output member is configured to drive a first vehicle wheel on a first side of a vehicle. The second output member is configured to drive a second vehicle wheel on a second side of the vehicle. The power distribution system is driven by the input member and distributing torque between the first and second output members. The power distribution system has a differential and a transmission. The differential has first and second differential outputs that are received in a differential case. The first differential output is coupled directly to the first output member. The transmission is configured to control rotary power transmitted through the differential to the first and second output members. The axle assembly is operable in a first mode, a second mode and a third mode. Operation of the axle assembly in the first mode has no effect on a torque transmitted from the second differential output to the first and second output members. Operation of the axle assembly in the second and third modes causes a first offset torque to be applied to the second output member and an equal but opposite second offset torque to be applied to the first output member. The first offset torque is positive when the axle assembly is operated in the second mode and wherein the first offset torque is negative when the axle assembly is operated in the third mode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
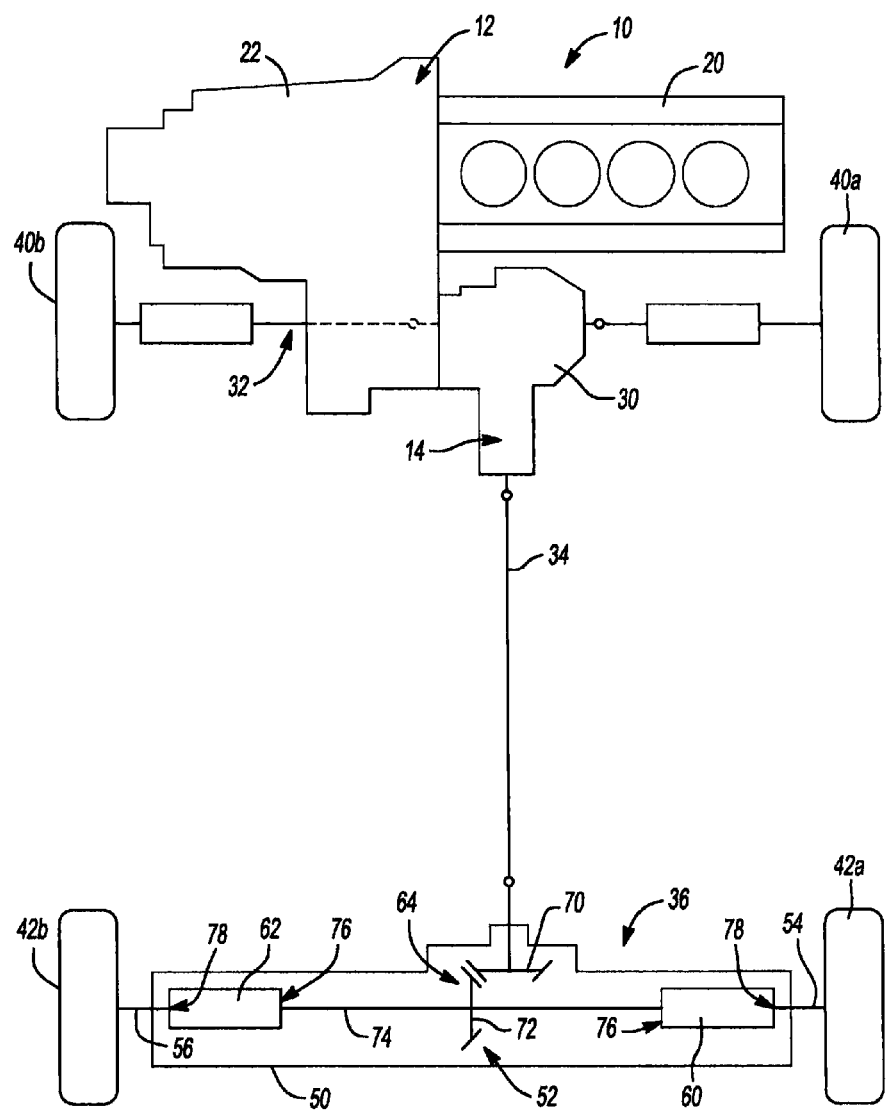
FIG. 1 is a schematic illustration of a vehicle constructed in accordance with the teachings of the present disclosure.

With reference to FIG. 1 of the drawings, a vehicle constructed in accordance with the teachings of the present invention is generally indicated by reference numeral 10. The vehicle 10 can include a power train 12 and a drive train 14. the power train 12 can include a source of rotary power, such as an engine 20, and a transmission 22 for transmitting the rotary power to the drive train 14. The drive train 14 can include a power transmitting device 30, a front axle assembly 32, a propshaft 34 and a rear axle assembly 36. In the particular example provided, the power transmitting device 30 is a power take-off and the drive train 14 is an all-wheel drive-type power train. Those of ordinary skill in the art will appreciate, however, that any suitable power transmitting device, such as a transfer case, a differential or a viscous coupling, could be employed in lieu of the power take-off, or that the power transmitting device 30 could be omitted altogether (so that the drive train 14 is configured as either a front wheel drive or rear wheel drive-type drive train). Accordingly, it will be appreciated that the particular embodiment illustrated and described herein is exemplary and that the present disclosure has application to various other types of drive trains.

The power transmitting device 30 can receive rotary power from the transmission 22 and can distribute the rotary power to the front and rear axle assemblies 32 and 36 in a desired manner. In the present example, the power transmitting device 30 distributes rotary power between the front and rear axle assemblies 32 and 36 in a predetermined (fixed) manner, such as a 60%-40% split. Rotary power transmitted to the front axle assembly 32 is employed to drive a pair of front wheels 40a and 40b, whereas rotary power transmitted to the rear axle assembly 36 (via the propshaft 34) is employed to drive a pair of rear wheels 42a and 42b.

The front and rear axle assemblies 32 and 36 can be configured similarly and as such, only a detailed discussion of the rear axle assembly 36 will be provided herein. The rear axle assembly 36 can include an axle housing 50, a power distribution system 52, a first output member 54, and a second output member 56. The power distribution system 52 can include a first variable transmission assembly 60, a second variable transmission assembly 62, and a means 64 for transmitting rotary power (e.g., from the propshaft 34) to the first and second variable transmission assemblies 60 and 62. The first and second variable transmission assemblies 60 and 62 can include any type of continuously variable transmission, such as a Milner-type continuously variable transmission. Milner-type continuously variable transmissions are described in U.S. Pat. Nos. 6,461,268 and 7,125,359, the disclosures of which are hereby incorporated by reference as if fully set forth in their entirety herein. In the example provided, the rotary power transmitting means 52 includes an input pinion 70, a ring gear 72 and an intermediate shaft 74.

The input pinion 70 can be housed in the axle housing 50 and supported for rotation about a first axis via a set of bearings (not shown) in a conventional and well known manner. The ring gear 72 can be meshingly engaged to the input pinion 70 and can be coupled for rotation to the intermediate shaft 74. The intermediate shaft 74 can be housing in the axle housing 50 and supported for rotation about a second axis via a set of bearings (not shown). The second axis can be generally perpendicular to the first axis. The intermediate shaft 74 can be coupled to an input portion 76 of each of the first and second variable transmission assemblies 60 and 62. An output portion 78 of each of the first and second variable transmission assemblies 60 and 62 can be coupled to a respective one of the first and second output members 54 and 56.

Figure 2:
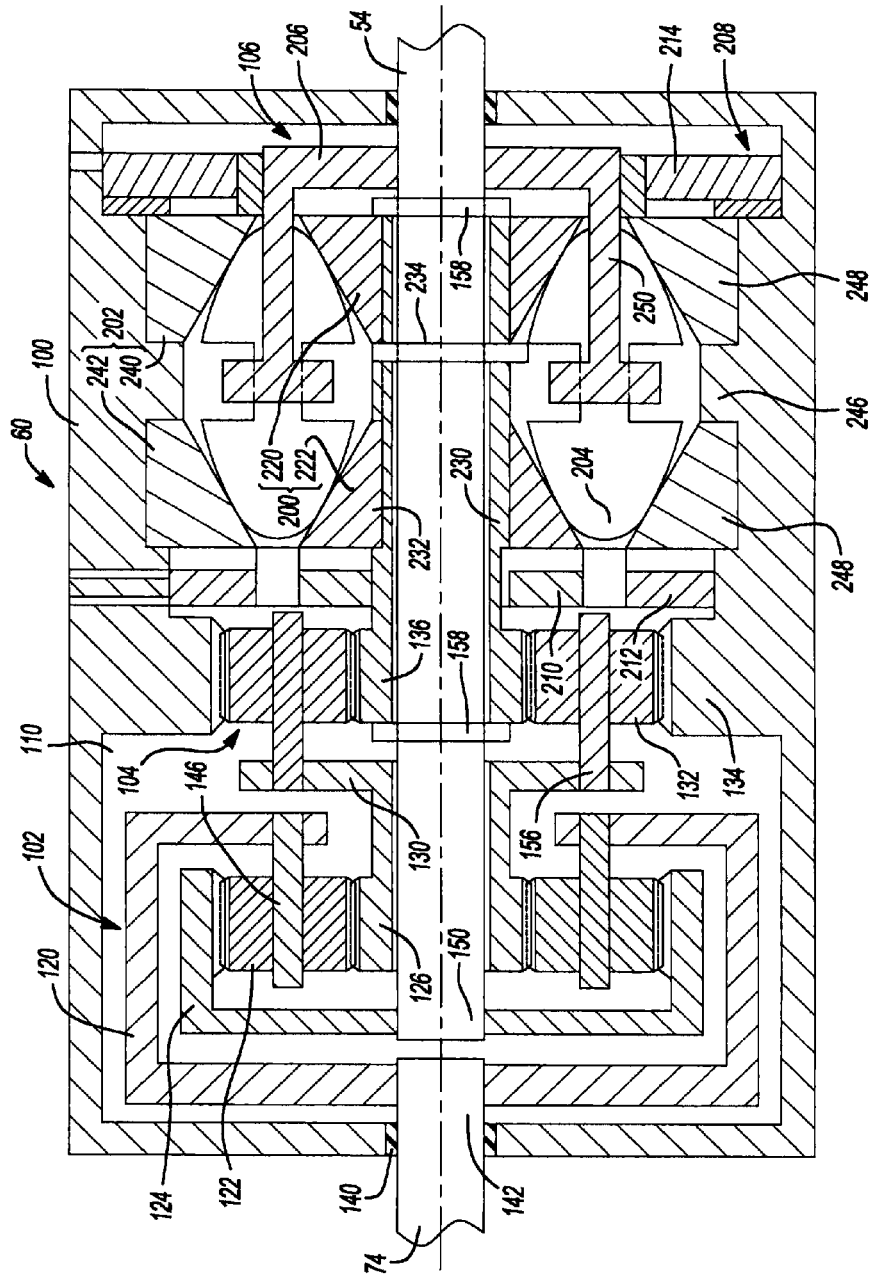
FIG. 2 is a section view of a portion of the vehicle of FIG. 1 illustrating a portion of the power distribution system in longitudinal cross-section.

With reference to FIG. 2, the first variable transmission assembly 60 is illustrated in more detail. It will be appreciated that the second variable transmission assembly 62 (FIG. 1) can be similarly constructed and as such, a detailed discussion of the first variable transmission assembly 60 will suffice for both.

The first variable transmission assembly 60 can include a transmission housing 100, a first gear set 102, a second gear set 104 and a continuously variable transmission 106. The transmission housing 100 can be integrally formed with the axle housing 50 (FIG. 1), but is a discrete component in the example provided for ease of the assembly of the rear axle assembly 36 (FIG. 1). The transmission housing 100 can define a cavity 110 into which the first gear set 102, the second gear set 104 and the continuously variable transmission 106 can be received. The first gear set 102 can include a first planet carrier 120, a first set of planet gears 122, a first ring gear 124 and a first sun gear 126, while the second gear set 104 can include a second planet carrier 130, a second set of planet gears 132, a second ring gear 134 and a second sun gear 136.

A first bearing 140 can be disposed between the intermediate shaft 74 and the transmission housing 100 to rotatably support an end 142 of the intermediate shaft 74. The first planet carrier 120 can be coupled for rotation to the end 142 of the intermediate shaft 74. The first planet gears 122 can be journally supported on first pins 146 that can be non-rotatably coupled to the first planet carrier 120. The first ring gear 124 can be coupled for rotation to a proximal end 150 of the first output member 54. The first sun gear 126 can be journally mounted on the first output member 54 so as to be rotatably thereon. While not shown, it will be appreciated that any suitable means, such as snap rings, may be employed to maintain the position of the first sun gear 26 in a predetermined axial position relative to the first output member 54. The first planet gears 122 can be meshingly engaged to the first ring gear 124 and the first sun gear 126.

The second planet carrier 130 can be coupled for rotation with the first sun gear 126 and can include a plurality of second pins 156 that can journally support the second planet gears 132. The second ring gear 134 can be non-rotatably coupled to (e.g., integrally formed with) the transmission housing 100. The second sun gear 136 can be journally mounted on the first output member 54 so as to be rotatable thereon. While not shown, it will be appreciated that any suitable means, such as snap rings 158, may be employed to maintain the position of the second sun gear 136 in a predetermined axial position relative to the first output member 54. The second planet gears 132 can be meshingly engaged to the second ring gear 134 and the second sun gear 136.

The continuously variable transmission 106 can be a continuously variable transmission similar to that described in U.S. Pat. No. 7,125,359. Briefly, the continuously variable transmission 106 can include an inner race 200, an outer race 202, a plurality of planets 204, a transmission output or carrier 206 and an actuator 208 that can include a first actuator 210, a second actuator 212 and a third actuator 214. The inner race 200 can include an axially fixed race part 220 and an axially displaceable race part 222. In the particular example provided, the axially fixed race part 220 and the axially displaceable race part 222 are non-rotatably but axially slidably disposed on the second sun gear 136 via a set of mating axially extending spline teeth 230 and 232 that can be formed on the second sun gear 136 and the race parts 220 and 222, respectively. The axially fixed race part 220 can be axially fixed relative to the second sun gear 136 via a snap ring 234 and the snap ring 158. The outer race 202 can include a pair of axially displaceable race parts 240 and 242 that can be non-rotatably but axially slidably coupled to the transmission housing 100 via a set of mating axially-extending spline teeth 246 and 248 that can be formed on the transmission housing 100 and the race parts 240 and 242, respectively. The planets 204 can be mounted for rotation on links 250 that can be connected to the planet carrier 206 that can be rotatably coupled to the first output member 54. The first, second and third actuators 210, 212 and 214 can be selectively actuated to move the axially displaceable races 222, 240 and 242, respectively, in one or more predetermined axial directions. In the particular example provided, the first, second and third actuators 210, 212 and 214 are single-acting hydraulic cylinders that can be actuated to move the axially displaceable races 222, 240 and 242 toward the planets 204, but it will be appreciated that various other types of actuators could be employed in the alternative.

In operation, rotary power is input to the first variable transmission assembly 60 via the intermediate shaft 74, which transmits rotary power to the first planet carrier 120. The first gear set 102 can operate to split the torque that is transmitted through the first variable transmission assembly 60 in a predetermined manner. For example, the first gear set 102 can be configured to transmit approximately 75% of the torque input to the first variable transmission assembly 60 to the first ring gear 124 and the remaining torque to the first sun gear 126. Those of ordinary skill in the art will appreciate that the gear ratio of the first gear set 102 can be selected to split the torque between the first ring gear 124 and the first sun gear 126 in a desired manner. Since the first ring gear 124 is coupled for rotation with the first output member 54, torque received by the first ring gear 124 can be transmitted directly to the first output member 54. Similarly, since the first sun gear 126 is coupled for rotation with the second planet carrier 130, torque received by the first sun gear 126 can be input to the second gear set 104 via the second planet carrier 130.

The second gear set 104 can be configured to reduce the torque and increase the speed of the rotary power received from the first sun gear 126. The second gear set 104 can output rotary power to the continuously variable transmission 106 via the second sun gear 136. The speed reduction ratio of the continuously variable transmission 106 can be controlled through the positioning of the axially displaceable races 222, 240 and 242 via the first, second and third actuators 210, 212 and 214.

In the example provided, the combination of torque splitting (via the first gear set 102) and torque reduction (via the second gear set 104) results in the transmission of only about 6% of the torque that is input to the first variable transmission assembly 60 to the continuously variable transmission 106. Accordingly, the continuously variable transmission 106 can be constructed so as to be compact and to have a relatively low-mass.

Figure 3:
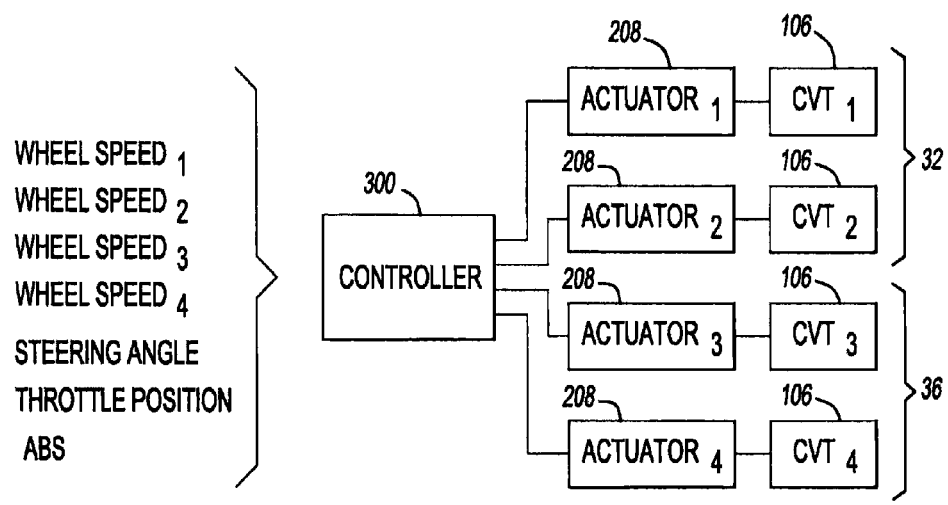
FIG. 3 is a schematic illustration of a portion of the vehicle of FIG. 1 illustrating the controller of the power distribution system in more detail.

With reference to FIG. 3, the actuators 208 of the continuously variable transmissions 106 associated with the front and rear axle assemblies 32 and 36 can be continuously controlled via a controller 300 in response to vehicle data from a vehicle controller (not shown). Such vehicle data can include, for example, the speed of each of the front wheels 40a and 40b (FIG. 1), the speed of each of the rear wheels 42a and 42b (FIG. 1), a steering angle, and a throttle position.

The front and rear axle assemblies 32 and 36 of this example permit precise, seamless and indefinitely variable independent wheel speed control within predetermined limits, full torque vectoring (both front-to-rear and side-to-side), improved fuel efficiency due to the elimination of slip clutches, the ability to gear the rear axle assembly differently (faster or slower) than the front axle assembly as required by vehicle dynamics, and enhanced performance including increased traction in low mu ($\mu$) and split mu ($\mu$) conditions.

Figure 4:
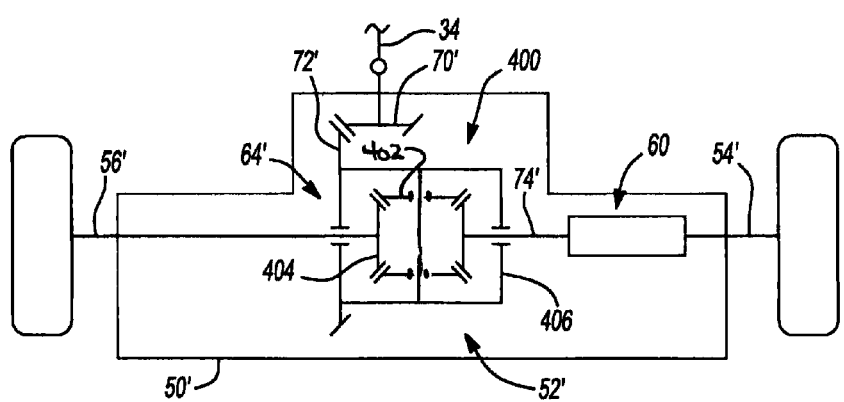
FIG. 4 is a schematic illustration of a portion of another vehicle constructed in accordance with the teachings of the present disclosure.

While the front and rear axle assemblies 32 and 36 have been illustrated and described as including a pair of continuously variable transmissions 106, those of ordinary skill in the art will appreciate that an axle assembly constructed in accordance with the teachings of the present disclosure can be constructed somewhat differently. With reference to FIG. 4, another axle assembly constructed in accordance with the teachings of the present disclosure is generally indicated by reference number 36'. The axle assembly 36' can be similar to the rear axle assembly 36 of FIG. 1 and can include an axle housing 50', a power distribution system 52', a first output member 54', and a second output member 56'. The power distribution system 52' can include a variable transmission assembly 60 (which can be identical to the first variable transmission assembly 60 described above), and means 64' for transmitting rotary power (e.g., from the propshaft 34) to the variable transmission assembly 60 and the second output member 56'. The power transmitting means 64' can include an input pinion 70', a ring gear 72', a differential assembly 400 and an intermediate shaft 74'. The input pinion 70' can be housed in the axle housing 50' and supported for rotation about a first axis via a set of bearings (not shown) in a conventional and well known manner. The differential 400 can be supported for rotation within the axle housing 50' about a second axis. The differential 400 can include a pair of pinion gears 402 and a pair of side gears 404 that can be received within a differential case 406. The ring gear 72' can be coupled for rotation with the differential case 406 and can be meshingly engaged to the input pinion 70'. The intermediate shaft 74' can be coupled for rotation with a first one of the side gears 404 and can transmit rotary power from the differential 400 to the first planet carrier 120 (FIG. 2) of the variable transmission assembly 60. The first output member 54' can be coupled to the first ring gear 124 (FIG. 2) and the planet carrier 206 (FIG. 2) of the continuously variable transmission 106 (FIG. 2), while the second output member 56' can be coupled for rotation with a second one of the side gears 404.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A vehicle driveline comprising:

an axle assembly having an input member, a first output member, a second output member and a power distribution system, the input member being configured to receive a rotary input, the first output member being configured to drive a first vehicle wheel on a first side of a vehicle, the second output member being configured to drive a second vehicle wheel on a second side of the vehicle, the power distribution system being driven by the input member and distributing torque between the first and second output members, the power distribution system comprising a differential and a transmission, the differential having first and second differential outputs that are received in a differential case, the first differential output being coupled directly to the first output member, the transmission being configured to control rotary power transmitted through the differential to the first and second output members, the axle assembly being operable in a first mode, a second mode and a third mode, wherein operation of the axle assembly in the first mode has no effect on a torque transmitted from the second differential output to the second output member, wherein operation of the axle assembly in the second mode reduces the torque that is transmitted from the second differential output to the second output member relative to the torque that is supplied to the second output member when the axle assembly is operated in the first mode, and wherein operation of the axle assembly in the third mode increases the torque that is transmitted from the second differential output to the second output member relative to the torque that is supplied to the second output member when the axle assembly is operated in the first mode;

wherein the transmission further comprises a variable ratio reduction.

2. The vehicle driveline of claim 1, wherein the transmission is disposed along a rotational axis of the second output member.

3. The vehicle driveline of claim 2, wherein the input member is coupled directly to the differential.

4. The vehicle driveline of claim 1, wherein the differential is disposed between the input member and the transmission.

5. The vehicle driveline of claim 1, wherein the transmission cooperates with the differential to increase the torque that is transmitted to the first output member when the axle assembly is operated in the second mode.

6. The vehicle driveline of claim 1, wherein the transmission cooperates with the differential to decrease the torque that is transmitted to the first output member when the axle assembly is operated in the third mode.

7. The vehicle driveline of claim 1, wherein the transmission comprises at least one planetary-type gear reduction.

8. The vehicle driveline of claim 1, wherein the variable ratio reduction comprises a Milner-type continuously variable transmission.

9. A vehicle driveline comprising:

an axle assembly having an input member, a first output member, a second output member and a power distribution system, the input member being configured to receive a rotary input, the first output member being configured to drive a first vehicle wheel on a first side of a vehicle, the second output member being configured to drive a second vehicle wheel on a second side of the vehicle, the power distribution system being driven by the input member and distributing torque between the first and second output members, the power distribution system comprising a differential and a transmission, the differential having first and second differential outputs that are received in a differential case, the first differential output being coupled directly to the first output member, the transmission being configured to control rotary power transmitted through the differential to the first and second output members, the axle assembly being operable in a first mode, a second mode and a third mode, wherein operation of the axle assembly in the first mode has no effect on a torque transmitted from the second differential output to the first and second output members, wherein operation of the axle assembly in the second and third modes causes a first offset torque to be applied to the second output member and an equal but opposite second offset torque to be applied to the first output member, wherein the first offset torque is positive when the axle assembly is operated in the second mode and wherein the first offset torque is negative when the axle assembly is operated in the third mode;

wherein the transmission further comprises a variable ratio reduction.

10. The vehicle driveline of claim 9, wherein the transmission is disposed along a rotational axis of the second output member.

11. The vehicle driveline of claim 10, wherein the input member is coupled directly to the differential.

12. The vehicle driveline of claim 9, wherein the differential is disposed between the input member and the transmission.

13. The vehicle driveline of claim 9, wherein the transmission comprises at least one planetary-type gear reduction.

14. The vehicle driveline of claim 9, wherein the variable ratio reduction comprises a Milner-type continuously variable transmission.

* * * * *